US007169439B2

(12) United States Patent
Pendleton et al.

(10) Patent No.: US 7,169,439 B2

(45) Date of Patent: Jan. 30, 2007

(54) METHODS FOR REPAIRING A REFRACTORY WALL OF A HIGH TEMPERATURE PROCESS VESSEL UTILIZING VISCOUS FIBROUS REFRACTORY MATERIAL

(75) Inventors: Kevin D. Pendleton, Brook Park, OH (US); Stephen D. Cherico, North Olmsted, OH (US)

(73) Assignee: Fosbel Intellectual Limited, Coleshill (GB)

( * ) Notice: Subject to any disclaimer, the term of this patent is extended or adjusted under 35 U.S.C. 154(b) by 604 days.

(21) Appl. No.: 10/213,373

(22) Filed: Aug. 7, 2002

(65) Prior Publication Data

US 2004/0037955 A1 Feb. 26, 2004

(51) Int. Cl.
*B32B 35/00* (2006.01)
*B05D 7/22* (2006.01)
*F27D 1/16* (2006.01)
*C21B 7/06* (2006.01)

(52) U.S. Cl. ...................... 427/140; 427/181; 427/236; 264/30; 266/281

(58) Field of Classification Search ................ 427/140, 427/142, 181, 230, 236, 239; 264/30; 138/97; 266/281; 239/8
See application file for complete search history.

(56) References Cited

U.S. PATENT DOCUMENTS 3,413,385 A 11/1968 Komac et al.
3,684,560 A 8/1972 Brichard et al. ......... 117/105.1

(Continued)

FOREIGN PATENT DOCUMENTS

EP 0 069 286 A1 1/1983

(Continued)

OTHER PUBLICATIONS

International Search Report from PCT/IB03/03758.

*Primary Examiner*—William Phillip Fletcher, III
(74) *Attorney, Agent, or Firm*—Nixon & Vanderhye P.C.

(57) ABSTRACT

Systems and methods are provided whereby pumpable viscous fibrous material may be applied onto surfaces of high temperature process vessels while hot (i.e., while at or near such vessels' high operational temperatures of several hundreds up to several thousands of degrees Fahrenheit). More specifically, there are preferably provided a lance having a nozzle structure at a distal end thereof, and a pump system for pumping a pumpable fibrous refractory material to the nozzle. The lance has a length sufficient to allow it to be inserted into the high temperature process vessel so that the nozzle structure is adjacent an area in need of repair while an operator holds a proximal end thereof outside the vessel. In use, the lance is inserted into the process vessel while the process vessel is at or near its high operational temperature so that the nozzle structure is positioned adjacent to an area of the process vessel wall in need of repair, and so that the lance may be manipulated from outside the process vessel during repair of the wall thereof. Manipulating the lance from outside the process vessel will thereby cause the atomized spray of the fibrous material to contact the wall of the process vessel thereby repairing the same.

7 Claims, 4 Drawing Sheets

U.S. PATENT DOCUMENTS

| | | | | | |
|---|---|---|---|---|---|
| 3,957,203 | A | | 5/1976 | Bullard | |
| 4,201,342 | A | * | 5/1980 | Stram | 239/129 |
| 4,494,737 | A | * | 1/1985 | Rymarchyk et al. | 266/281 |
| 4,792,468 | A | | 12/1988 | Robyn et al. | 427/422 |
| 4,893,752 | A | * | 1/1990 | Spink et al. | 239/427.3 |
| 5,155,070 | A | * | 10/1992 | Skorupa | 501/103 |
| 5,976,632 | A | | 11/1999 | Gerber et al. | |
| 6,034,345 | A | * | 3/2000 | Firestone | 219/98 |
| 6,152,054 | A | * | 11/2000 | Ashworth et al. | 110/345 |

FOREIGN PATENT DOCUMENTS

| | | | | |
|---|---|---|---|---|
| EP | 0069286 | B1 | | 1/1983 |
| GB | 1 592 360 | | * | 7/1981 |
| GB | 2 237 803 | A | | 5/1991 |

* cited by examiner

METHODS FOR REPAIRING A REFRACTORY WALL OF A HIGH TEMPERATURE PROCESS VESSEL UTILIZING VISCOUS FIBROUS REFRACTORY MATERIAL

FIELD OF THE INVENTION

The present invention relates generally to systems and methods whereby fibrous refractory material may be applied onto surfaces of high temperature process vessels while at or near their operational high temperatures.

BACKGROUND AND SUMMARY OF THE INVENTION

High temperature process vessels (e.g., furnaces, kilns, smelters and the like) are employed in a variety of industries. Typically, the wall surfaces of such high temperature process vessels have an internal coating or lining formed of a solid high temperature refractory material. Such internal refractory coatings or linings may sometimes need to be repaired, especially during the latter part of their operational duty cycles.

One well known technique to repair refractory wall surfaces of high temperature process vessels while at or near their high operational temperatures is colloquially referred to as "ceramic welding". More specifically, ceramic welding techniques is carried out while the refractory lining is still hot so as to minimize downtime of the process vessel and to preclude cracking of the lining which might occur on cooling below its operational temperatures. In ceramic welding, a stream of welding particles (usually a particulate mixture of metals and metal oxides) is propelled in a stream of a gaseous fluid, preferably oxygen, through a fluid (typically water) cooled elongate lance. The particles impinge on the area of the refractory lining to be welded and, due to the elevated temperature of such lining, the particles fuse to form a ceramic weld thereat. In use, the lance is inserted into the process vessel while at or near its high operational temperatures, for example, at or near several hundreds of degrees Fahrenheit (e.g., about 500° F.) to up to several thousands of degrees Fahrenheit (e.g., from 1000 to up to about 3000° F.). The operator physically holds the proximal end of the lance outside the process vessel, and manipulates the lance as to position the distal end adjacent the area in need of welding. The operator is therefore shielded from the extreme high temperatures existing within the process vessel, but is nonetheless capable of directing the stream of particulates toward the refractory lining inside the vessel by virtue of the liquid-cooled lance. (See generally, U.S. Pat. No. 3,684,560, the entire content of which is expressly incorporated hereinto by reference.)

Some refractory linings are fibrous structures which have, prior to the present invention, not been repaired using ceramic welding or other hot repair techniques. In this regard, unlike the particulate materials which can be entrained in pressurized gas and propelled through the thermally protected lance, the precursor fibrous refractory material is typically in the form of a relatively viscous pumpable paste material. As such, the material can only be atomized just prior to being applied onto a surface. For such reason, fibrous refractory materials have previously been applied to process vessel surfaces while cold.

It would therefore be highly desirable if pumpable viscous (e.g., paste-like) fibrous refractory materials could be applied onto the internal surfaces while hot (i.e., while the process vessel is at or near its high operational temperatures). It is towards providing such techniques and systems that the present invention is directed.

Broadly, the present invention is embodied in systems and methods whereby pumpable viscous fibrous material may be applied onto surfaces of high temperature process vessels while hot (i.e., while at or near such vessels' high operational temperatures of several hundreds up to several thousands of degrees Fahrenheit).

More specifically, according to a preferred system for repairing fibrous refractory on walls of a high temperature process vessel according to the present invention, there are provided a lance having a nozzle structure at a distal end thereof, and a pump system for pumping a pumpable fibrous refractory material to the nozzle. The lance has length sufficient to allow the lance to be inserted into the high temperature process vessel so that the nozzle structure is adjacent an area in need of repair while an operator holds a proximal end thereof outside the vessel.

Most preferably, the lance of the present invention will a material supply tube in communication with the nozzle structure for directing the pumpable fibrous material from the pump system to the nozzle structure. Inlet and discharge cooling liquid conduits are provided in the lance to allow circulation of a coolant (e.g., water) through the lance to protect the lance from high temperatures within the process vessel. Importantly, an atomizing tube is provided as a component part of the lance so as to be in thermal communication therewith. The atomizing tube has an inlet at the proximal end of the lance so as to be positioned outside the process vessel, and a discharge end which fluid communicates with the material supply tube adjacent the nozzle structure. Introduction of an atomizing gas through the tube will therefore atomize the fibrous pumpable material upon discharge through the nozzle structure.

In use, according to the method of repairing a fibrous refractory wall of a high temperature process vessel according to the present invention, a protective liquid-cooled lance having an atomizing tube in thermal communication therewith is inserted into the process vessel while the process vessel is at or near its high operational temperature so that a nozzle structure of the lance at a distal end thereof is positioned adjacent to an area of the process vessel wall in need of repair, and so that the lance may be manipulated from outside the process vessel during repair of the wall thereof. A viscous fibrous refractory material may then be pumped from a source thereof from the proximal end of the lance to the nozzle structure at the distal end of the lance, while an atomizing gas is directed through the atomizing tube. In such a manner, the atomizing gas causes the flowable fibrous refractory material to be discharged from the nozzle structure of the lance in the form of an atomized spray. Manipulating the lance from outside the process vessel will thereby cause the atomized spray of the flowable fibrous material to contact the wall of the process vessel thereby repairing the same.

These, as well as other, aspects and advantages of the present invention will become more clear from the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
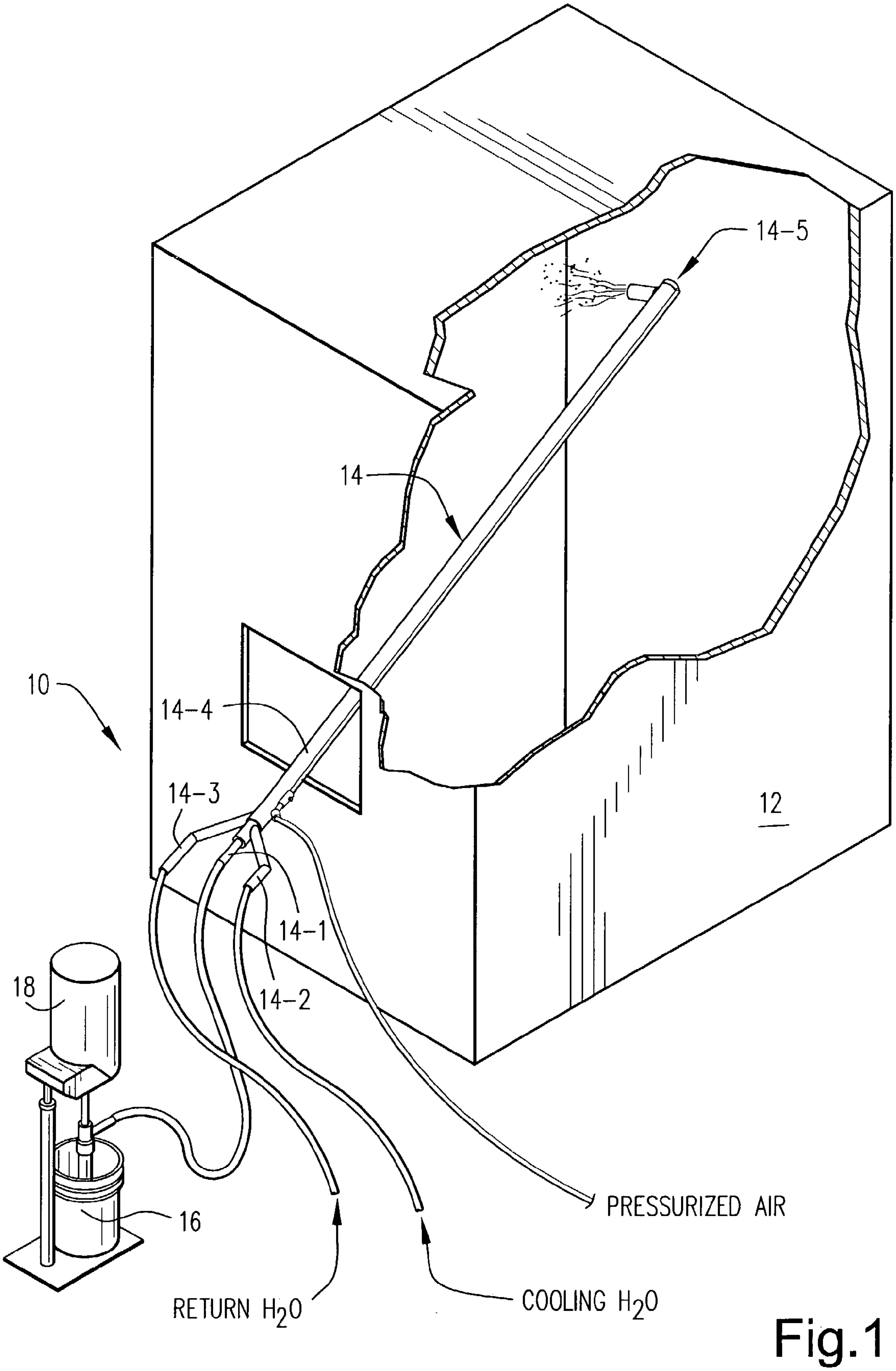
FIG. 1 is a schematic representation of a representative embodiment of a system in accordance with the present invention in use to repair the fibrous refractive lining of a high temperature process vessel.

An exemplary system 10 for applying a pumpable viscous fiber-containing refractory material onto interior wall surfaces of a high temperature process vessel 12 while "hot" (i.e., while the vessel 12 is at or near its high operational temperatures) is depicted in accompanying FIG. 1. The system 10 generally includes a fluid-cooled lance 14, a source 16 of pumpable viscous fibrous refractory material, and a pump 18 to transfer the material from the source 16 thereof to an material inlet tube 14-1 at the proximal end of the lance 14.

Virtually any gas or liquid coolant may be employed to thermally protect the lance 14. Preferably, the coolant fluid is water, but any other coolant gas or liquid may be employed as may be desired for the particular repair operation. For convenience, water will hereinafter be referenced as the coolant and thus the lance 14 will hereinafter sometimes be referred to as "water-cooled" as use of a water as a coolant is typically preferred.

At its proximal end, the lance 14 also includes an inlet conduit arm 14-2 for introducing cooling water into the lance 14, and a discharge conduit arm 14-3 to allow the cooling water to be discharged therefrom. An atomizing line 14-4 traces the lance 14 along its length to allow pressurizing air to be directed to a distally located atomizing nozzle structure 14-5. As will be discussed in greater detail below, the distal nozzle 14-5 of the lance 14 allows atomized fibrous material to be sprayed onto the interior wall surfaces of the process vessel 12.

Figure 2:
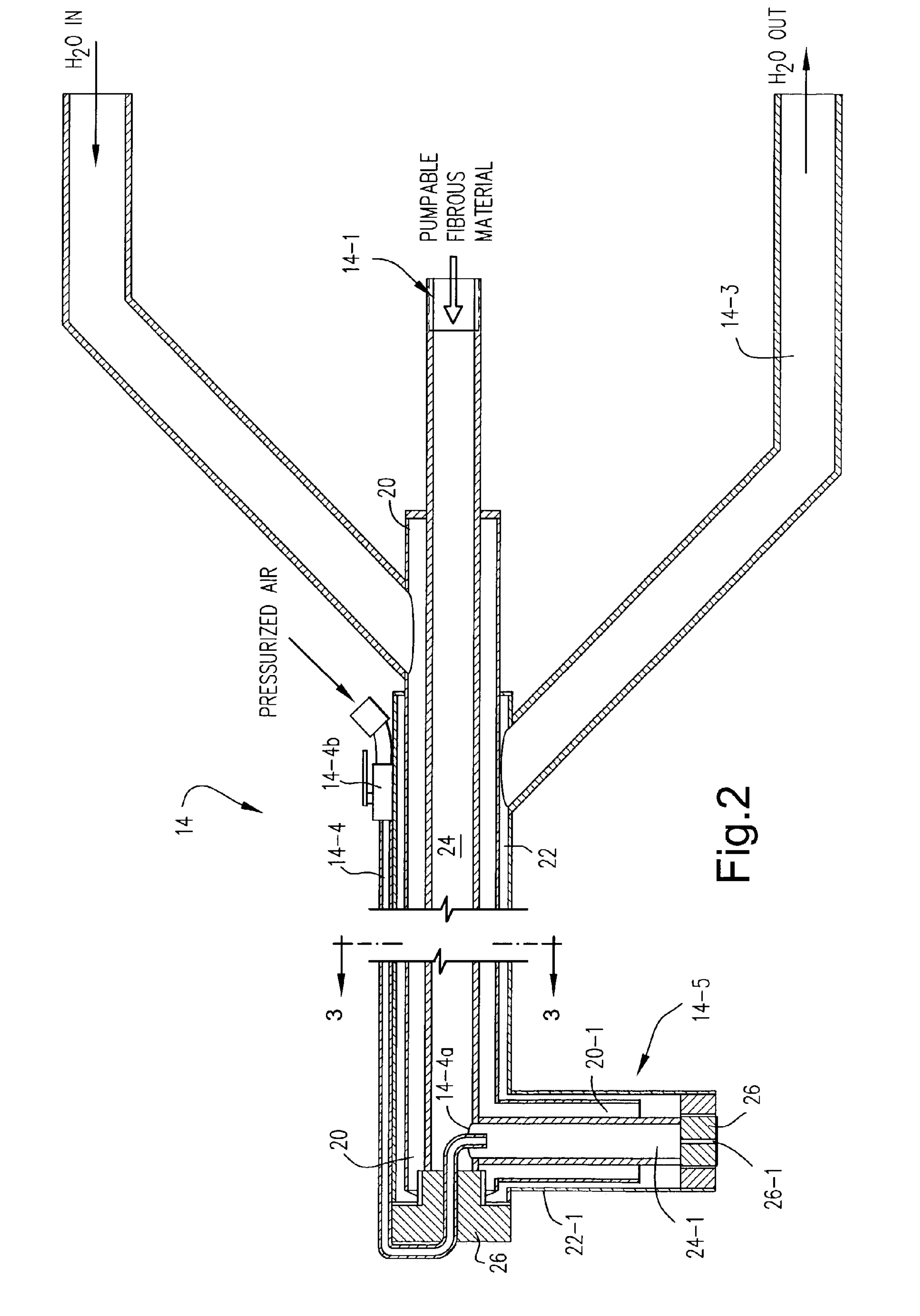
FIG. 2 is cross-sectional view of one embodiment of a liquid-cooled lance in accordance with the present invention.
Figure 3:
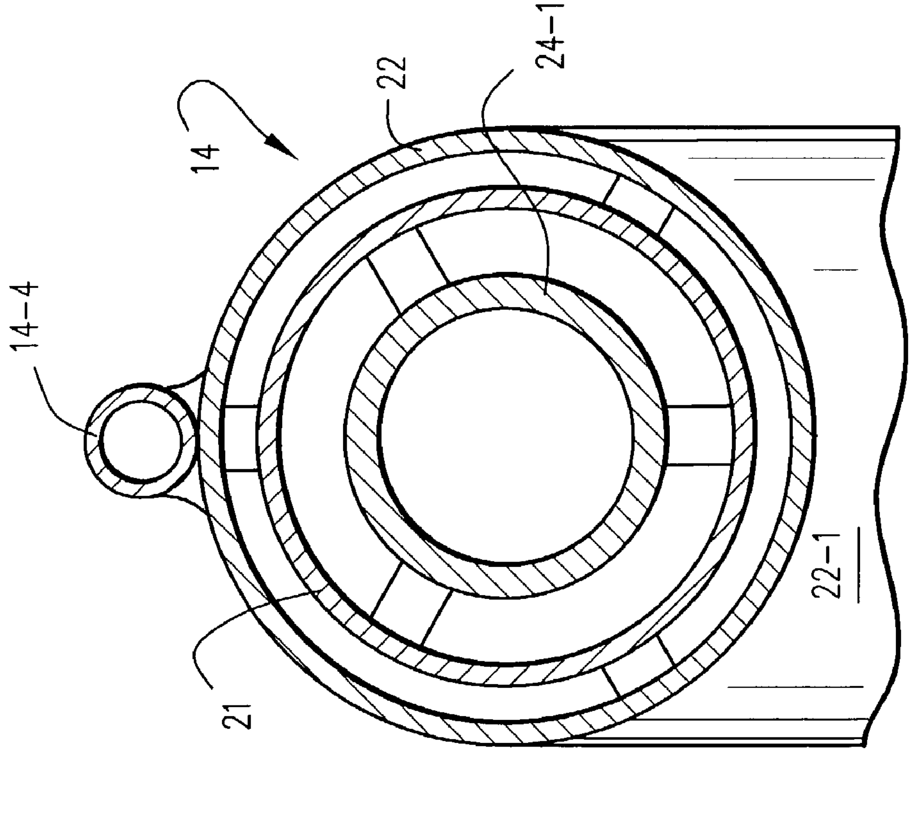
FIG. 3 is cross-sectional view of the lance depicted in FIG. 2 as taken along line 3—3 therein.

The lance 14 depicted in FIG. 1 is shown in greater detail in accompanying FIGS. 2 and 3. In this regard, the lance 14 is formed generally of concentrically disposed inner and outer cooling tubes 20, 22 which collectively and concentrically surround material supply tube 24. The inner and outer cooling tubes 20, 22 are respectively fluid connected to the inlet and outlet conduit arms 14-2 and 14-3, while the material supply tube 24 is fluid-connected to the material inlet 14-1. As noted briefly above, the lance 14 is of sufficient length to allow the operator to stand physically outside the process vessel 12 during operation, while permitting the atomized pumpable material to be applied to the desired locations on the interior wall surfaces of the vessel.

The cooling tubes 20, 22 and material supply tube 24 are blocked at their distalmost ends by means of plug member 26. Cooling water flow in the tubes 20, 22 thus communicates respectively with the inner and outer stub tubes 20-1, 22-1, while material flow in the supply tube 24 communicates with the material stub tube 24-1 which is connected to the nozzle plug 26 so that material may be expelled through the nozzle opening 26-1. The inner cooling stub tube 20-1 terminates proximally of the nozzle plug 26. As such, cooling water introduced into the lance via the conduit arm 14-2 flows in the annular space between the inner tube 20 and the material supply tube 24, and is redirected into the inner stub tube 20-1. The cooling water then flows into the annular space defined between the inner and outer stub tubes 20-1, 20-2 by virtue of the former terminating in advance of the nozzle plug 26. As such, the cooling water is returned to the discharge conduit arm 14-3 within the annular space defined between the inner and outer cooling tubes 20, 22.

Important to the present invention is the presence of the rigid atomizing line 14-4 which is physically fixed to, and hence is in thermal communication with, the outer cooling tube 22. Thus, the atomizing air within the line 14-4 is cooled along its entire length by virtue of the cooling water circulating within the annular space between the inner and outer cooling tubes 20, 22, respectively (i.e., since the tube 14-4 is in thermal communication with the outer tube 22). The terminal end 14-4*a* of the tube 14-4 is redirected through the plug 25 so as to be disposed concentrically within the material supply stub tube 24-1. As such, the pumpable fibrous material being supplied to the stub tube 24-1 via the inlet tube 24 is atomized by the pressurized air discharged from the terminal end 14-4*a* of tube 14-4 and thereby sprayed from the nozzle opening 26-1 of the nozzle plug 26 onto the wall of the vessel 12. A valve 14-4*b* is preferably provided at the proximal portion of the lance 14 so as to allow the operator to control the atomization of the fibrous material.

Figure 5:
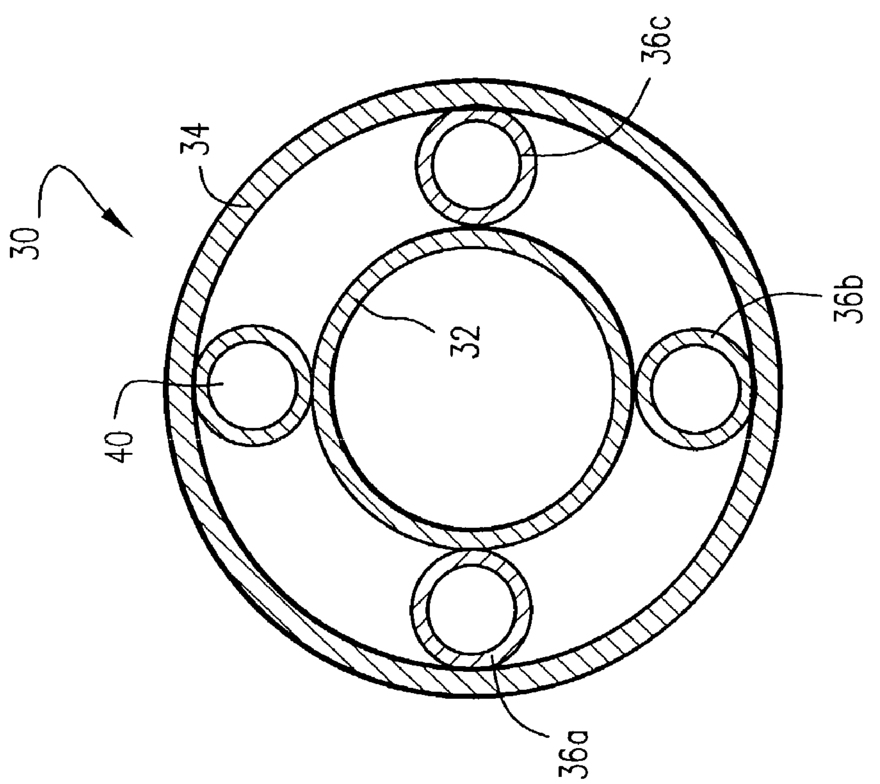
FIG. 5 is a cross-sectional view of the lance depicted in FIG. 4 as taken along line 5—5 therein.
Figure 4:
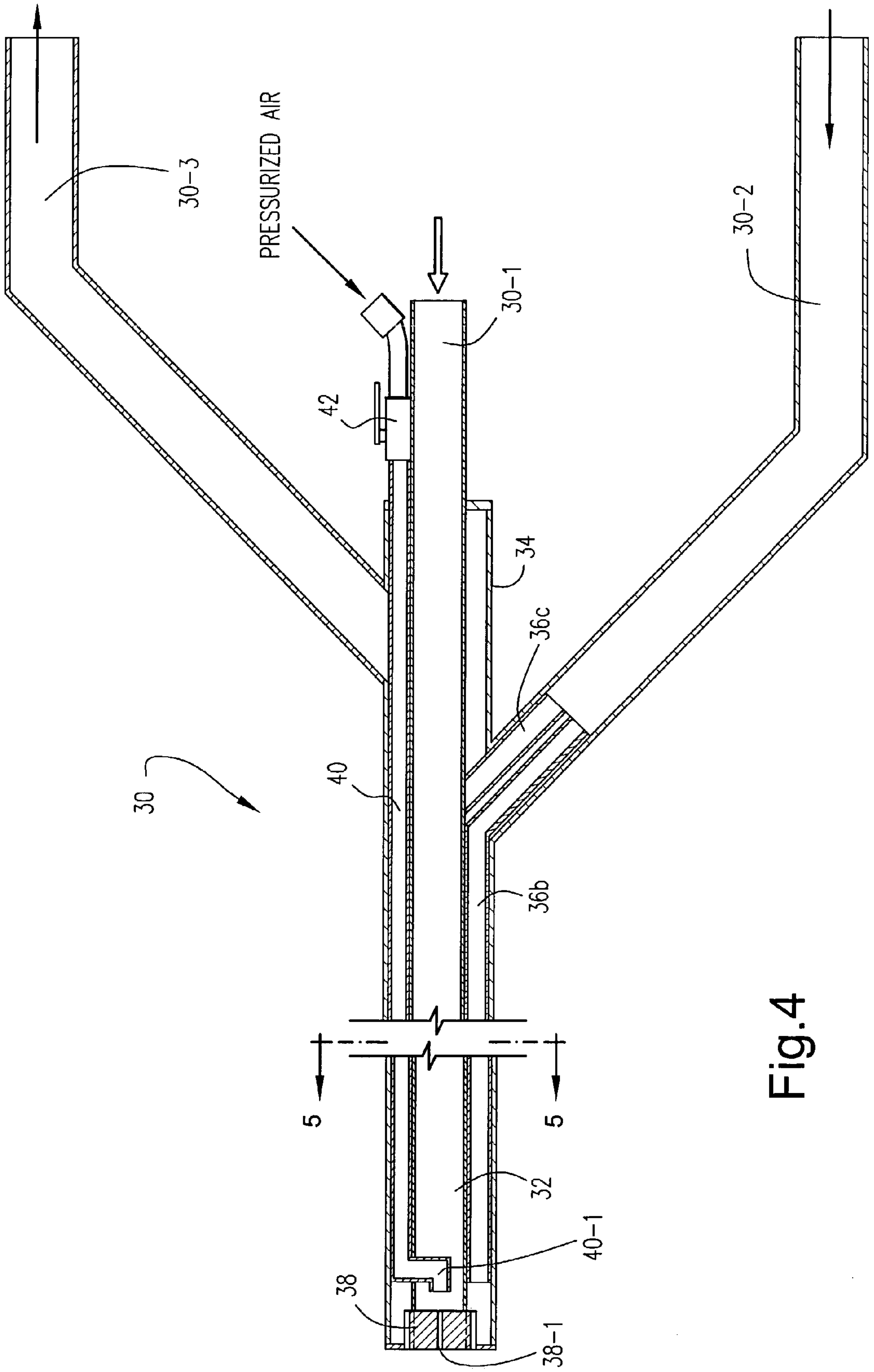
FIG. 4 is a cross-sectional view of another embodiment of a liquid-cooled lance in accordance with the present invention.

An alternative embodiment of a lance 30 in accordance with the present invention is depicted in accompanying FIGS. 4 and 5. In this regard, it will be observed that the lance 14 depicted in FIGS. 2 and 3 is especially useful in directing an atomized spray of pumpable fibrous material laterally (e.g., at a right angle) relative to the lance's elongate axis, whereas the lance 30 allows the atomized pumpable fibrous material to be sprayed generally in the same direction as the lance's elongate axis. As such, the lances 14, 30 may be used as desired to apply the pumpable fibrous material onto discrete portions of the interior walls of the process vessel 12.

Similar to the lance 14 described previously, the lance 30 depicted in FIGS. 4 and 5 likewise has a material inlet tube 30-1 (similar to the tube 14-1), and cooling water inlet and outlet conduits 30-2 and 30-3 (similar to the conduits 14-2, 14-3, respectively). The material inlet tube 30-1 is fluid connected to a material supply tube 32 which is concentrically surrounded by a cooling water outlet tube 34 fluid-connected to the water inlet conduit 30-2. Multiple cooling water supply tubes 36*a*, 36*b* and 36*c* are positioned physically within the annular space defined between the material supply tube 32 and the cooling water outlet tube 34 (see FIG. 5).

Cooling water supplied into the inlet conduit 30-2 thus enters the proximal ends of the tubes 36*a*–36*c*. (It will be appreciated in this regard that, because of the cross-sectioning of the lance 30 in FIG. 4, only the tubes 36*a* and 36*b* are visible therein.) Since the terminal ends of tubes 36*a*–36*c* terminate proximally of the nozzle plug 38 at the distalmost end of the lance 30, the cooling water will then flow within the annular space defined between the material supply tube 32 and the cooling water outlet tube 34, and then into the cooling water outlet conduit 30-3

The atomizing line 40 is, like the tubes 36*a*–36*c*, disposed physically in the annular space defined between the material supply tube 32 and the cooling water outlet tube 34. Thus, the atomizing line 40 is in direct thermal communication with the cooling water which flows in such annular space thereby protecting the same from the high temperature environment within the process vessel 12. The distal end 40-1 of the atomizing line 40 projects into the material supply tube 32 proximally upstream of the nozzle plug 38. Most preferably, the distal end 40-1 of the atomizing line 40 is aligned coaxially with the nozzle opening 38-1 and the elongate axis of the lance 30. A valve 42 is preferably provided in the atomization tube 40 at the proximal portion of the lance 30 so as to allow the operator to control the atomization of the fibrous material.

The particular pumpable fibrous material that may be handled by the systems and techniques of the present invention is not critical. A variety of pumpable refractory fibrous materials are known in the art and commercially available from a number of sources. For example, the pumpable fibrous materials commercially available from Unifrax Corporation of Niagara Falls, N.Y. may be employed successfully. In general, such pumpable fibrous materials have a putty-like consistency (e.g., a viscosity of about 1000 Poise or greater) with a wet density of between about 65 to about 90 lb/ft$^3$ (typically between about 70 to about 85 lb/ft$^3$) containing between about 20 to about 60% solids (fibers).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing a fibrous refractory wall of a high temperature process vessel having an operational temperature of about 500° F. up to about 3000° F., comprising the steps of:

(a) providing a thermally protected lance having an atomizing tube in thermal communication therewith and a nozzle structure which includes a nozzle opening at a distal end of the lance, wherein the atomizing tube has a discharge opening which is proximally spaced from, but coaxially aligned with, the nozzle opening of the nozzle structure;

(b) inserting the a thermally protected lance into the process vessel while said process vessel is at or near its high operational temperature so that the nozzle opening of the nozzle structure at the distal end thereof is positioned adjacent to an area of the process vessel wall in need of repair, and so that the lance may be manipulated from outside the process vessel during repair of the wall thereof;

(c) pumping a fibrous refractory material having a viscosity of about 1,000 Poise or greater from a source thereof at the proximal end of the lance to the nozzle opening of the nozzle structure at the distal end of the lance;

(d) directing an atomizing gas through the atomizing tube so that the atomizing gas is discharged from the discharge opening thereof coaxially upstream of the nozzle opening and into the fibrous refractory material proximally of the nozzle opening to thereby cause the fibrous refractory material to be discharged from the nozzle opening of the nozzle structure in the form of an atomized spray; and (e) manipulating the lance from outside the process vessel so as to cause the atomized spray of the fibrous material to contact the wall of the process vessel thereby repairing the same.

2. The method of claim 1, which comprises circulating a liquid coolant through the lance within liquid inlet and discharge conduits.

3. The method of claim 2, which comprises fixing the atomizing tube to a surface of one of said liquid inlet and discharge conduits.

4. The method of claim 2, which comprises pumping the fibrous refractory material through a material supply tube positioned concentrically within said liquid inlet conduit, and positioning the atomizing tube within an annular space defined between said material supply tube and said liquid inlet conduit.

5. The method of claim 1, which comprises directing the atomized spray of the material transversely relative to the lance.

6. The method of claim 5, wherein the lance has an elongate axis, and wherein the nozzle opening of the nozzle structure is oriented transversely relative to the elongate axis, the method comprising positioning the discharge opening of the atomizing tube in coaxial alignment upstream of said nozzle opening so that said discharge opening is likewise oriented transversely relative to the elongate axis of the lance.

7. The method of claim 1, which comprises directing the atomized spray of material coaxially relative to the lance.

* * * * *